United States Patent Office 3,452,353
Patented June 24, 1969

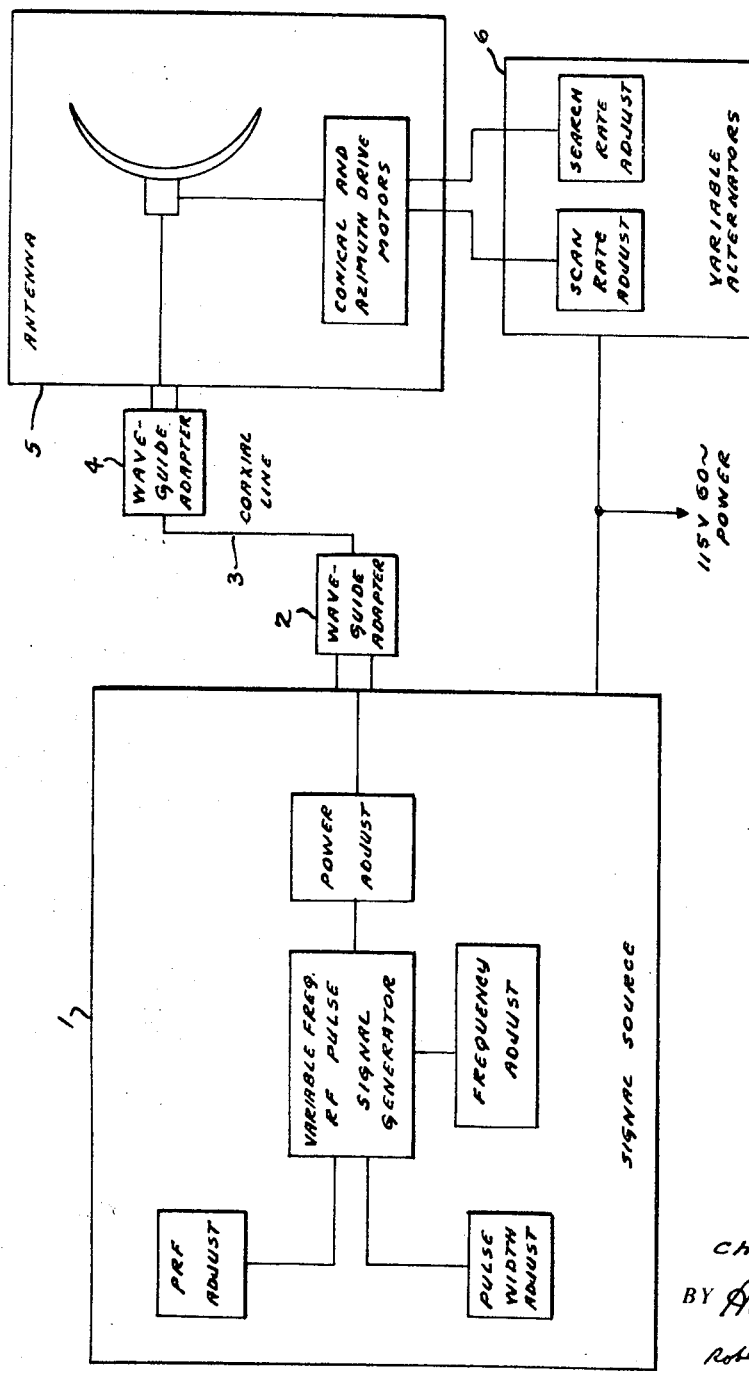

3,452,353
CONICAL AND NAVIGATION RADAR SCAN SIMULATOR FOR TESTING ELECTRONIC COUNTERMEASURES SYSTEM
Charles A. Neuendorf, 4452 Paola Way,
San Diego, Calif. 92117
Filed May 6, 1968, Ser. No. 726,967
Int. Cl. G01s 7/40
U.S. Cl. 343—17.7                         1 Claim

ABSTRACT OF THE DISCLOSURE

A source of radiant RF energy that has adjustable signal characteristics and adjustable radiation characteristics for simulating the radiation from radar transmitters for use in stationary, ground testing of electronic countermeasures equipment and personnel training.

Background of the invention

The field of this invention is in test equipment for ECM systems.

Prior art test equipment of a similar nature in this field is well known. Examples being the AN/ALM–14 Countermeasures Receiver Test Set with the ALA–28 Modulator, the AN/ALM–79 Set, the APR–25 Set, and the APR–26 Set. While the foregoing pieces of equipment provide very detailed and extensive information on the operation of ECM equipment they do not provide for the ground simulation of flight conditions that is provided by this invention.

Summary of the invention

A small, compact radar simulator is provided which has variable search scan and conical scan modes with controlled power, variable pulse width, variable frequency, and variable pulse repetition frequencies. The device radiates into free space so that all ECM antennas and systems may be simultaneously tested under conditions simulating actual operation.

Brief description of the drawing

The drawing shows a functional block diagram of an embodiment of the invention.

Description of the preferred embodiment

This invention by having readily adjustable signal characteristics provides a test signal that will simulate many different types of opposing radars. Thus, the capability of response of an ECM system may be evaluated under many simulated conditions. The device is for stationary ground usage thus saving valuable flight test time. Ideally the device is contained on a portable cart that may be positioned at random distances and angles from the ECM bearing vehicle. The device may be positioned on a runway apron a few hundred feet from an aircraft equipped with an ECM system and the overall response of the ECM system evaluated. This will include the proximity effects on the ECM antennas caused by the aircraft frame.

The typical search type radar operation to be simulated will have an operating frequency between 8500 and 9600 megahertz, a pulse width between ½ and 5 microseconds, a PRF (pulse repetition frequency) between 200 and 2000 p.p.s. (pulses per second) and an antenna beam horizontally scanned at a rate from 5 to 20 cycles per minute.

The typical airborne interceptor radar system operation to be simulated will have an operating frequency between 8500 and 9600 mHz., a pulse width between ½ and 1 microsecond, a PRF between 1000 and 2000 p.p.s., and a conically scanned antenna beam scanned at a rate from 50 to 100 cycles per second.

In operating the simulator the radiated energy from the antenna into free space is adjusted to provide various levels of simulated radar signals and to compensate for various distances that the simulator is located from the ECM aircraft.

In the embodiment shown in the drawing, the signal source 1 is a type AN/UPM–56 Radar Test Set. This signal source provides a variable output frequency from 8500 to 9600 mHz., a variable pulse width from .01 to 10 microseconds, a variable PRF from 100 to 100,000 p.p.s., and has an adjustable power output from 0 dbm. to −105 dbm. Thus this signal source has all the signal requirements to simulate both the search and the intercept radars. Other electronic generators that have the capabilities of the foregoing requirements may be used.

The antenna 5 is a conventional X band antenna having two drive motors. One drive motor spins the antenna feed mechanism which generates the conical scanning and therefore controls the scanning rate of the antenna beam. The other motor oscillates the antenna in a horizontal plane through approximately 150° of azimuth. An antenna from a MG–10 radar system has given very satisfactory operation in this invention.

The variable frequency alternators 6, one for each antenna drive motor, receive 115 volt, 60 Hz. power and provide 115 volt power adjustable from 100 to 500 Hz. These alternators, having a variable frequency output, are a conventional stock item.

In the particular operating embodiment being described, the signal source 1 has a waveguide signal output connection. A conventional UG–466/u waveguide to coaxial line adapter 2 is used at the output of the signal source to couple to the coaxial line 3 which conducts the radar frequency energy to the antenna 5 where a similar UG–466/u adapter connects the coaxial line to the waveguide input to the antenna.

To simulate a searching radar threat the alternator driving the conical scan antenna motor is set to zero output and the alternator driving the azimuth motor is set to provide the desired search scan rate by the search rate adjustment control. The adjustable parameters of the signal source are set to the known conditions of the particular radar being simulated.

For simulating an airborne interceptor radar threat under "lock-on" conditions, the azimuth search rate adjustment is set to zero and the scan rate adjustment is set to provide the proper conical scanning rate of the simulated intercept radar. To simulate the searching of an airborne intercept radar both alternators are adjusted to provide an output energizing both antenna drive motors.

In addition to testing the operation of ECM equipment, this invention has also been found to be very beneficial in training ECM personnel to recognize particular types of threats and take the necessary ECM action.

I claim:
1. A radar simulator for providing test signals for testing ECM equipment, the simulator comprising:
  (a) a radio frequency signal source means for providing radio frequency energy pulses having,
   (1) means for varying the frequency of the said pulses over at least the radio frequency range from 8500 mHz. to 9600 mHz.,
   (2) means for varying the width of the said pulses at least over the range of ½ microsecond to 5 microseconds,
   (3) means for varying the pulse repetition rate of the said pulses at least from 100 pulses per second to 2000 pulses per second, and

(4) means for varying the power of the said pulses at least over the range of 0 dbm. to −105 dbm.,
(b) antenna means for radiating into space the said radio frequency pulses and having
 (1) motor driving means for providing a conical scan, and
 (2) motor driving means for providing an azimuth search scan,
(c) variable frequency alternator means cooperating with the said antenna means for providing a variable conical scanning rate and a variable azimuth search rate, and
(d) coupling means cooperating with the signal source means and the antenna means for conducting the radio frequency energy from the source to the antenna.

References Cited
UNITED STATES PATENTS 3,219,744  11/1965  Mazziotti et al. _____ 35—10.4

RODNEY D. BENNETT, Jr., *Primary Examiner.*

T. H. TUBBESING, *Assistant Examiner.*

U.S. Cl. X.R.

35—10.4; 343—17.1